US008982292B2

(12) United States Patent
Chen et al.

(10) Patent No.: US 8,982,292 B2
(45) Date of Patent: Mar. 17, 2015

(54) LIGHT MODULATOR FOR OPTICAL IMAGE PROJECTION

(71) Applicant: Alcatel-Lucent USA, Incorporated, Murray Hill, NJ (US)

(72) Inventors: Gang Chen, Westfield, NJ (US); Mihaela Dinu, Freehold, NJ (US); Roland Ryf, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/746,984

(22) Filed: Jan. 22, 2013

(65) Prior Publication Data
US 2013/0128133 A1 May 23, 2013

Related U.S. Application Data

(60) Division of application No. 12/357,835, filed on Jan. 22, 2009, now Pat. No. 8,390,749, which is a continuation-in-part of application No. 12/017,440, filed on Jan. 22, 2008, now Pat. No. 8,109,638.

(51) Int. Cl.
G02F 1/135 (2006.01)
G02F 1/13 (2006.01)
G02B 27/28 (2006.01)
H04N 9/31 (2006.01)

(52) U.S. Cl.
CPC .......... G02F 1/1313 (2013.01); G02B 27/283 (2013.01); H04N 9/315 (2013.01); H04N 9/3161 (2013.01); H04N 9/3173 (2013.01); H04N 9/3197 (2013.01)
USPC ................................. 349/25; 349/5

(58) Field of Classification Search
None
See application file for complete search history.

(56) References Cited

U.S. PATENT DOCUMENTS

| 5,506,597 | A  | 4/1996  | Thompson et al. |
| 6,323,984 | B1 | 11/2001 | Trisnadi        |
| 6,340,230 | B1 | 1/2002  | Bryars et al.   |
| 6,365,526 | B1 | 4/2002  | Kanamori et al. |
| 6,704,065 | B1 | 3/2004  | Sharp et al.    |

(Continued)

FOREIGN PATENT DOCUMENTS

| EP | 1176803 A1 | 1/2002 |
| EP | 1283434 A2 | 2/2003 |

(Continued)

OTHER PUBLICATIONS

"DC-DC Converted Basics" published on line at: http://www.powerdesigners.com/InfoWeb/design_center/articles/DC-DC/converter.shtm; 12 pages.

(Continued)

Primary Examiner — Richard Kim
(74) Attorney, Agent, or Firm — Hitt Gaines, PC

(57) ABSTRACT

A spatial light modulator comprising an array-type liquid crystal panel, a polarization beam splitter, an oblique wave plate and a converging lens. The polarization beam splitter is orientated to direct a source light towards a reflective planar surface of the array-type liquid crystal panel. The oblique wave plate and converging lens are located between the polarization beam splitter and the array-type liquid crystal panel. The converging lens is configured to direct light from the reflective planar surface onto a facing surface of the polarization beam splitter.

11 Claims, 5 Drawing Sheets

(56) References Cited

U.S. PATENT DOCUMENTS

| | | |
|---|---|---|
| 6,791,739 B2 | 9/2004 | Ramanujan et al. |
| 6,839,181 B1 | 1/2005 | Cobb et al. |
| 6,897,926 B2 | 5/2005 | Mi et al. |
| 7,440,158 B2 | 10/2008 | Giles et al. |
| 7,502,160 B2 | 3/2009 | Aksyuk et al. |
| 7,597,446 B2 | 10/2009 | Okuyama et al. |
| 7,916,392 B2 | 3/2011 | Nakagawa et al. |
| 8,109,638 B2 | 2/2012 | Chen et al. |
| 8,129,669 B2 | 3/2012 | Chen et al. |
| 8,247,999 B2 | 8/2012 | Chen et al. |
| 2004/0218125 A1 | 11/2004 | Mi et al. |
| 2004/0239880 A1 | 12/2004 | Kapellner et al. |
| 2004/0263989 A1 | 12/2004 | Cobb et al. |
| 2005/0234734 A1 | 10/2005 | Chan et al. |
| 2005/0264734 A1 | 12/2005 | Robinson et al. |
| 2007/0046907 A1 | 3/2007 | Shin |
| 2007/0064163 A1* | 3/2007 | Tan et al. ............... 349/5 |
| 2008/0212034 A1 | 9/2008 | Aksyuk et al. |
| 2008/0212040 A1 | 9/2008 | Aksyuk |
| 2008/0219303 A1 | 9/2008 | Chen et al. |
| 2009/0184976 A1 | 7/2009 | Chen et al. |

FOREIGN PATENT DOCUMENTS

| | | |
|---|---|---|
| EP | 1734771 A1 | 12/2006 |
| JP | 2003262831 A | 9/2003 |
| JP | 2005018071 A | 1/2005 |
| WO | 2004064410 A1 | 7/2004 |

OTHER PUBLICATIONS

"S-334—Ultra-Long-Range Piezo Tip/Tilt Mirror"; Moving the NanoWorld, www.pi.we; 2 Pages.

J.W. Goodman, "Some Fundamental Properties of Speckle" Journal of the Optical Society of America, vol. 66, No. 11, pp. 1145-1150, Nov. 1976.

Greywall, Dennis S., et al.; "Crystalline Silicon Tilting Mirrors for Optical Cross-Connect Switches"; Journal of Microelectromechanical Systems, vol. 12, No. 5, Oct. 2003, pp. 708-712.

SC Kerigan, et al., "Perceived Speckle Reduction in Projection Display Systems" IP.com Journal, IP.com Inc., West Henrietta, NY, pp. 9-11, Jul. 1, 1997, XP-013106711.

International Search Report and Written Opinion, Application Number: PCT/US2009/000385, Applicant: Alcatel-Lucent USA Inc., Apr. 27, 2009, 9 pages.

* cited by examiner

LIGHT MODULATOR FOR OPTICAL IMAGE PROJECTION

CROSS-REFERENCE TO RELATED APPLICATION

This is a Divisional application of U.S. patent application Ser. No. 12/357,835 filed on Jan. 22, 2009 to Gang Chen et al., which claims the benefit of a continuation-in-part application of U.S. patent application Ser. No. 12/017,440, entitled, "DIFFUSER CONFIGURATION FOR AN IMAGE PROJECTOR," filed on Jan. 22, 2008, which are incorporated herein by reference in their entirety.

TECHNICAL FIELD

This application is directed, in general, to optical image projection systems having a spatial light modulator array-type liquid crystal panel.

BACKGROUND

This section introduces aspects that may help facilitate a better understanding of the inventions. Accordingly, the statements of this section are to be read in this light and are not to be understood as admissions about what is prior art or what is not prior art.

There is great interest in using array-type liquid crystal panels (LCP) as a spatial light modulator in the light modulator of an optical image projection system. Typically, polarized light passes through a polarization beam splitter (PBS) to the LCP. Individual liquid crystal pixels of the array forming the LCP can be activated or non-activated to cause the light to be reflected off of the LCP with the same polarization state or the orthogonal (e.g., opposite) polarization state, respectively, as the incoming light. Depending upon the configuration of the system, one linear polarization of, which is light reflected off the LCP, will pass through the PBS to projection optics and thereby provide a bright-field pixel. The orthogonal linear polarization component of the light will pass through the PBS in the direction orthogonal to the projection optics and thereby will provide a dark-field pixel.

SUMMARY

One embodiment provides a spatial light modulator. The modulator comprises an array-type liquid crystal panel. The modulator comprises a polarization beam splitter. The polarization beam splitter is orientated to direct source light towards a planar reflective surface of the array-type liquid crystal panel. The modulator comprises an oblique wave plate located between the polarization beam splitter and the array-type liquid crystal panel. The modulator comprises a converging lens located between the polarization beam splitter and the array-type liquid crystal panel. The converging lens is configured to direct light reflected from the planar reflective surface to a facing surface of the polarization beam splitter.

The device comprises an array-type liquid crystal panel, a polarization beam splitter an oblique wave plate and a converging lens. The polarization beam splitter is orientated to direct source light towards a reflective planar surface of the array-type liquid crystal panel. The oblique wave plate and a lens are located between the polarization beam splitter and the array-type liquid crystal panel. The converging lens is configured to direct light reflected from the reflective planar surface to a facing surface of the polarization beam splitter.

Another embodiment provides optical image projection system. The system comprises a light source configured to emit a source light. The system comprises a spatial light modulator optically coupled to receive the source light. The spatial light modulator includes an array-type liquid crystal panel. The spatial light modulator includes a polarization beam splitter. The polarization beam splitter is orientated to direct the source light towards a reflective planar surface of the array-type liquid crystal panel. The spatial light modulator includes an oblique wave plate located between the polarization beam splitter and the array-type liquid crystal panel. The spatial light modulator includes a converging lens located between the polarization beam splitter and the array-type liquid crystal panel. The converging lens is configured to direct the reflected light from the reflective planar surface to a facing surface of the polarization beam splitter. The system comprises projection optics configured to receive light output from the polarization beam splitter.

BRIEF DESCRIPTION OF THE DRAWINGS

The various embodiments can be understood from the following detailed description, when read with the accompanying figures. Various features may not be drawn to scale and may be increased or reduced in size for clarity of discussion. Reference is now made to the following descriptions taken in conjunction with the accompanying drawings, in which.

DETAILED DESCRIPTION

Figure 1A:
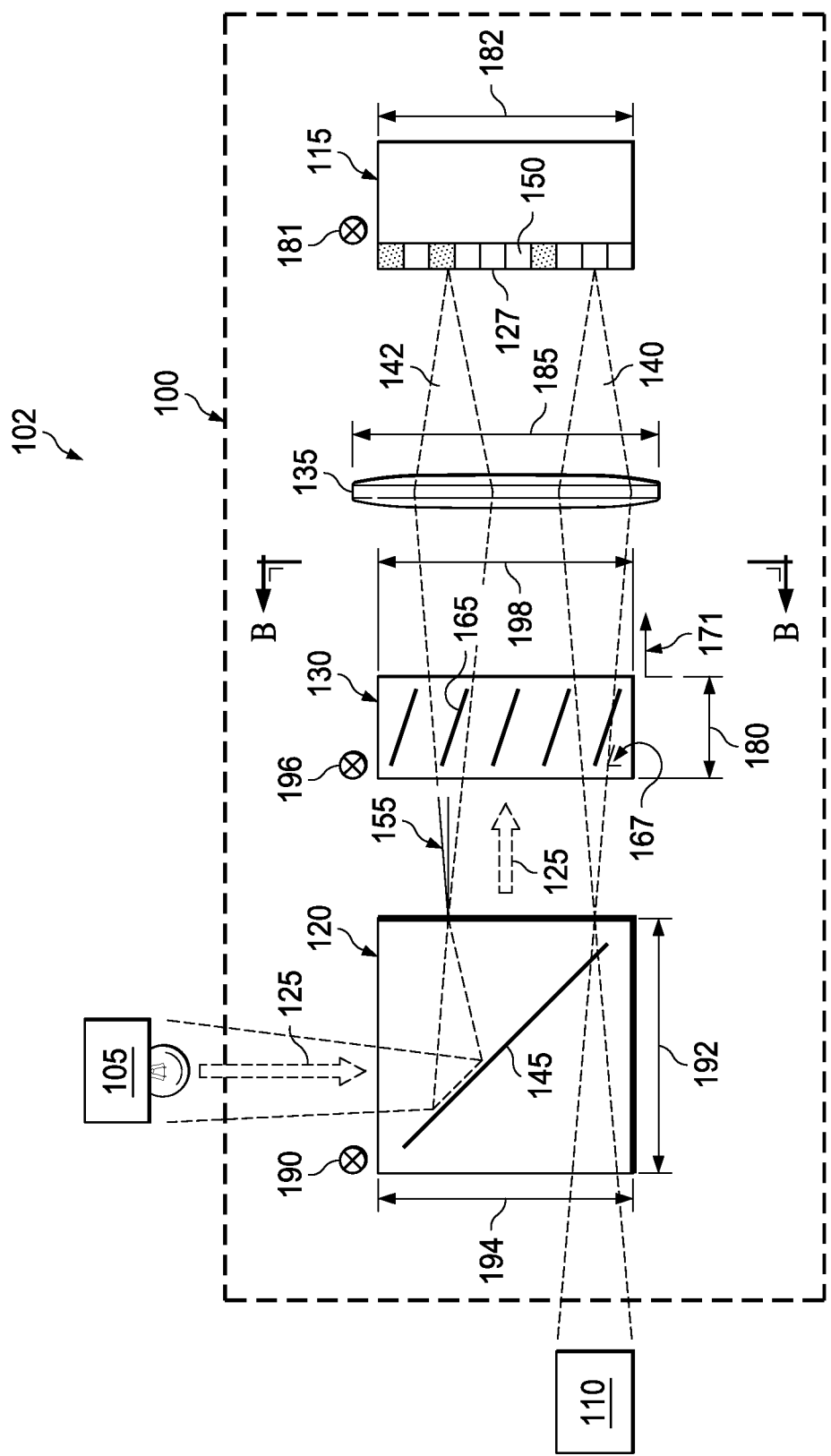
FIG. 1A presents a plane view of an example configuration of a spatial light modulator, shown as part of an optical image projection system of the disclosure.

Some LCP projection systems can suffer from poor image contrast. Additionally, such systems are not readily amenable to miniaturization because certain optical components must be kept large enough to capture substantially all of the light that divergently reflects off of the LCP panel.

It has been discovered that the sizes of optical components, such as the PBS and projection optics, can be reduced by situating a converging lens in the light path between the LCP and the PBS. The term converging lens as used herein is defined as a positive lens (e.g., a field lens) that is located closer to the image forming surface (e.g., the LCP surface) than any other lens. That is, any other lens or lenses in the projection optics of the optical module are closer to the target projection surface (e.g., a screen) than the converging lens. Unfortunately, a converging lens used alone, or with a quarter wave plate, may not provide the desired level of projected image contrast.

Embodiments of the disclosure benefit from the realization that substantial light leakage can occur when the polarized state of some light arriving at the reflecting surface of the PBS is not the same as the polarization state that can be rejected by the PBS. In particular, the polarization state of light reflected from non-activated pixels of the LCP and focused through the converging lens is altered. The polarization state is altered for light rays that have incident angles that are not normal to the PBS surface facing the LCP, with respect to the polarization state to be rejected by the PBS. This alteration in polarization state is such that at least some of the light that it is desirable to reject will instead can pass through the PBS to the projection optics of the projection system. This effect, referred to herein as polarization light ray skewing (PLRS), contributes to poor contrast.

It was also recognized that there can be other factors that contribute to poor contrast. One contributor can be the polarization rotation attributable to the presence of the converging lens, due to the ray trajectory produced by the double pass through the converging lens and reflection by the non-activated pixels of the LCP. Another contributor can be non-ideal LCP characteristics. In the non-activated state, an ideal LCP preserves the polarization state of the reflected light to be the same as the polarization state of the incident light. In contrast real (e.g., non-ideal) LCP pixels can be birefringent in the non-activated state and thus, can alter the polarization state (e.g., linear polarization state) of the incident light. Thus, a polarization component that is not rejected by the PBS is generated, leading to poor contrast.

It was also discovered, as part of the present disclosure, that light leakage due to PLRS can be substantially reduced by situating an oblique wave plate (o-plate) in the light path between the LCP and the PBS. The term o-plate as used herein is defined as a birefringent material (e.g., an optically anisotropic medium such as calcite or quartz crystals) configured to have a smooth flat outer surfaces and having an optical axis that is neither parallel nor perpendicular to the outer surfaces.

Additionally, in some cases, the o-plate can be adjusted to compensate the polarization change due to the reflection from birefringent non-activated pixels of the LCP. For instance, the o-plate can be adjusted to change the orientation of the optical axis of the o-plate with respect to a horizontal plane of the o-plate. Alternatively, a thin compensating waveplate can be added to the o-plate. As a consequence, it is possible to decrease the amount the light reflected from an non-ideal LCP, and having the polarization component that cannot be rejected by the PBS from the projection path. In some cases, these measures can also advantageously improve image contrast without substantially increasing system size, e.g., by the addition of a separate compensating waveplate connected to, or part of, the LCP.

The combination of the o-plate and the converging lens can allow the production of a more compact (e.g., hand-held) projection system that is capable of producing images with a higher contrast than hither-to possible. The converging lens effectively directs light reflected from the LCP to propagate closer to the optical axis by reducing the spread of the reflected light. Thus, the sizes of optical components can be reduced to enable a more compact projector system. The o-plate can improve contrast by compensating for global PLRS effects. The o-plate can act on the altered polarization state of light reflected from non-activated pixels of the LCP so as to substantially return the light's polarization state to what it would be if the reflected light rays had formed a non-divergent beam (e.g., a normal incident angle to the PBS's surface). Consequently, the PBS is better able to reject light reflected from the non-activated pixels of the LCP thereby reducing the amount of projected light from dark-field pixels and thereby improve image contrast.

One embodiment of the disclosure is a light modulator device (e.g., a spatial light modulator). The configuration of the light modulator device can differ depending upon the polarization state of the light source and desired polarization state of light to be projected. For instance, FIG. 1A presents a plan view of an example configuration of a light modulator device 100, shown as part of an optical image projection system 102. As illustrated in FIG. 1, embodiments of the system 102 can include a light source 105 and projection optics 110 that are optically coupled to the device 100.

Some features of the image projection system 102 described herein and the methods of using these features to produce projected images may be described in one or more of: the above cited U.S. patent application Ser. No. 12/017,440; U.S. Pat. No. 7,440,158; U.S. patent application Ser. Nos. 12/017,984, 12/009,991, and 12/009,851, which were all filed on Jan. 22, 2008; and U.S. patent application Ser. Nos. 11/713,155, 11/681,376, and 11/713,483, which were all filed on Mar. 2, 2007; and U.S. patent application Ser. No. 12/357,734, entitled, "Oscillating Mirror for Image Projection" to Gang Chen et al., filed on Jan. 22, 2009. The above-listed U.S. patent and the above-listed U.S. patent applications are incorporated herein by reference in their entirety.

The example device 100 shown in FIG. 1A comprises a LCP 115 and a PBS 120. The PBS 120 is orientated to direct a source light 125 towards a reflective planar surface 127 of the LCP 105. The device 100 also comprises an o-plate 130 and a converging lens 135. Both the o-plate 130 and the converging lens 135 are located between the LCP 115 and the PBS 120. The converging lens 135 can be configured to direct light 140, 142 (e.g., substantially all reflected light 140, 142) reflected from the reflective planar surface 127 of the LCP 115 onto an opposing (e.g., facing) surface 145 of the PBS 110.

In some cases, such as shown in FIG. 1A, the o-plate 130 is located between the PBS 120 and the converging lens 135. In other cases, the o-plate 130 is located between the converging lens 135 and the LCP 115 (not shown). In some cases, the former configuration (o-plate between the PBS and converging lens) provides substantially better contrast than the latter configuration (o-plate between the PBS and LCP) and therefore is a preferred embodiment. One of ordinary skill in the art would understand how to determine the optimal locations of the o-plate 130 and converging lens 135, relative to each other, and to the LCP 115 and PBS 120 so as to maximize image contrast for either of these configurations, including e.g., maximizing the amount of light delivered to and reflected from the LCP 115.

The LCP 115 comprises a plurality of pixels 150 that can be individually activated by applying an electric field across individual pixels 150 (e.g., via transparent indium tin oxide electrodes adjacent thereto). The light 140 reflected from activated pixels 150 has the opposite polarization state as compared to the polarization state of the source light 125. For example, when the light source 105 emits vertically polarized source light 125, then the reflected light 140 from activated pixels 150 is horizontally polarized.

In comparison, the polarization state of reflected light 142 from non-activated pixels 150 with an incident angle 155 that is normal with respect (e.g. 90 degree±5 degrees) to the PBS's opposing surface 145 is not substantially altered. However, as noted above, due to the PLRS effect, the polarization state of reflected light 142 from non-activated pixels 150 can be altered when the light 140 has a non-normal incident angle 155 (e.g., more than ±5 degrees). For instance, continuing with the same example of when the source light 125 is vertically polarized a substantial portion of reflected light 142 from non-activated pixels 150 and a non-normal incident angle 155 can be horizontally polarized. Because reflected light 142 from these non-activated pixels 150 has the same polarization state as the reflected light 140 from activated pixels 150, the light contrast between activated and non-activated pixels 150 is decreased.

Embodiments of the o-plate 130 can have planar outer surfaces 160, 162 that are parallel to the surface 145 of the PBS 120. One surface 160 opposes (e.g., faces) the surface 145 of the PBS 120 and the other surface 162 opposes (e.g., faces) the reflective surface 127 (e.g., a planar reflective surface) of the LCP 115. The planar outer surfaces 160, 162 of the o-plate can be substantially perpendicular to the source light 125 that passes from the PBS 120 to the LCP 115.

The o-plate 130 is important for reducing the amount of reflected light 142 from certain non-activated pixels 150 that otherwise would detrimentally pass through the PBS 110 and reach the projection optics 110 of the system 102 thereby reducing image contrast. The o-plate 130, by definition, has an optical axis 165 with an angle 167 that is neither parallel nor perpendicular with respect to the outer planar surface 160 of the o-plate 130. The outer planar surface 160 is located so as to receive the light 140, 142 reflected by the LCP 115. One skilled in the art would be familiar with various methods to characterize the optical axis 165 of the o-plate 130. For instance, one could measure the retardance of collimated light that passes through the o-plate 130, as a function of different incident angles (or polarizations) of the collimated light, to determine incident angle where the minimum retardance occurs.

In some preferred embodiments, the o-plate 130 has an optical axis 165 making an angle 167 that ranges from about 16 to 36 degrees, and more preferably, about 24 to 28 degrees. O-plates 130 having such characteristics can be particularly effective at compensating the polarization state of the light reflected 142 from non-activated pixels 150 to the same polarization state it would have if the incident angle 155 of reflected light 142 was normal to the PBS's opposing surface 145 (vertical polarized light in the above example).

As noted above, the o-plate 130 can be configured to at least partially compensate polarization changes due to the reflection from the birefringent non-activated pixels of the LCP 115 having non-ideal characteristics. In one embodiment, for instance, the orientation of the optical axis 165 of the o-plate 130 can be adjusted, by rotating the o-plate 130, to compensate the polarization change of the incident light 140, which occurs upon reflection off of the non-ideal birefringent pixels 150 of the LCP 115. The polarization of the reflected light 142 can thereby be at least partially restored to the polarization state that it would have if the non-activated pixels 150 were ideal.

Figure 1B:
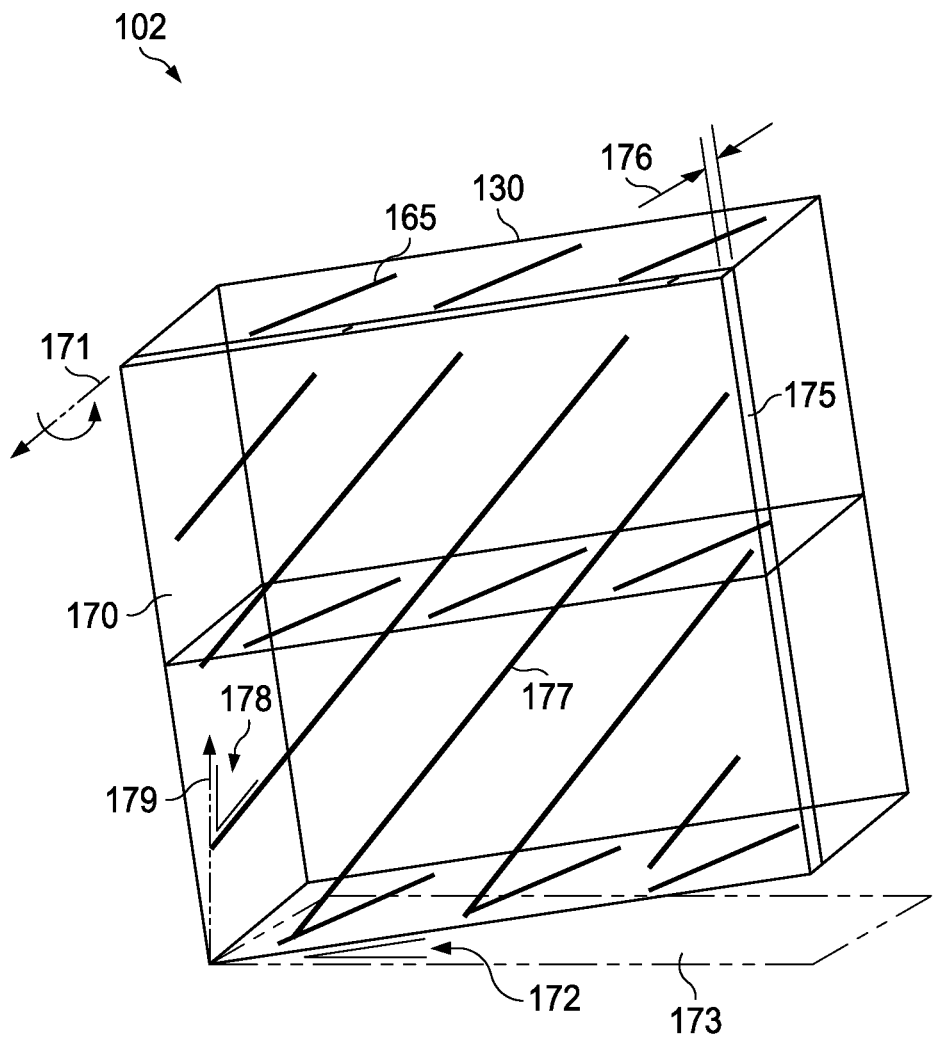
FIG. 1B presents a perspective view of an example configuration of the o-plate 130, substantially along view lines B-B shown in FIG. 1A, to illustrate an example adjustment in the orientation of the optical axis of the o-plate.

FIG. 1B presents a perspective view of an example configuration of the o-plate 130, substantially along view lines B-B shown in FIG. 1A, to illustrate an example adjustment in the orientation of the optical axis 165 of the o-plate 130. FIG. 1B illustrates that a planar surface 170 of the o-plate 130, defined by the optical axis 165 of the o-plate 130 and the normal axis 171 (also depicted in FIG. 1A) to the o-plate 130, has an angle 172 (e.g., by rotating the o-plate as shown by the curved arrow in FIG. 1B) in the range from about 3 to 4 degrees with respect to a horizontal plane 173 of the device 100 (e.g., the horizontal plane depicted in the plan view of FIG. 1A). One skilled in the art would understand how to adjust the angle 172 to different values, depending upon the extent of non-ideality of the birefringent pixels 150 (FIG. 1A).

In still other embodiments, the o-plate 130 can alternatively, or additionally, further include a thin waveplate layer 175 (e.g., a second waveplate) thereon (e.g., on surface 170 of the o-plate 130, shown in FIG. 1B). For instance, in some embodiments the additional waveplate layer 175 can have a thickness 176 in the range of about 1 to 10 microns. The thin waveplate layer 175 can have the appropriate optical axis 177 orientation and retardance, which are different from that of the o-plate 130, to improve compensation of the birefringence of the non-activated LCP pixels 150. E.g., at least one of the retardance or angle 178 of the optical axis 177 are at least about 10 percent different than the corresponding values for the o-plate 130. For instance, in some preferred embodiments, the orientation of the optical axis 177 corresponds to an angle 178 of about 45 degrees with respect to a vertical axis 179 (i.e. an axis perpendicular to the horizontal plane 173). In some preferred embodiments, the birefringence of the material of the waveplate layer 175 is of the opposite sign as that of the non-activated LCP pixels 150. In some cases, optical axes of the LCP pixels 150 and the waveplate layer 175 may be approximately aligned. In some preferred embodiments, the retardance of the layer 175 is in a range from about 3 to 5 nanometers. One skilled in the art would understand how to adjust the thickness 176 and orientation of the thin waveplate layer 175 so as to compensate the non-ideality of the birefringent pixels 150.

The thickness of the o-plate 130 can also affect the compensation of the polarization state of the light reflected 142 from the non-activated pixels 150 with non-normal incident angles 155. For instance, in some preferred embodiments, the o-plate 130 has a thickness 180 (FIG. 1A) in a range of about 3 to microns. However, depending upon the type of optically anisotropic crystal material the o-plate is composed of, a different thickness 180 value can be used to provide the desired half-wave light retardance.

Sometimes, the manufacture of o-plate thicknesses 180 of about 5 microns or greater can be difficult. In such cases, the angle 167 optical axis 165 and thickness 180 of the o-plate 130 can be cooperatively adjusted to achieve a balance between improved image contrast and ease of manufacturing the o-plate 130. These principles are illustrated below for some example embodiments that provide acceptable levels of ANSI image contrast (e.g., about 500:1 or greater). The term ANSI contrast as used herein refers to ratio of the average reflected light intensity from the activated pixels in 8 rectangles divided by the average reflected light intensity from the non-activated pixels in the other 8 rectangles with the activated and non-activated pixel sections arranged in a rectangular 4×4 checkerboard pattern. In some embodiments, an ANSI contrast of about 600:1 can be obtained using an optical axis angle 167 in the range of about 24 to 28 degrees and thickness 180 in the range of about 4 to 4.2 microns. In other embodiments, an ANSI contrast of about 1500:1 can be obtained using an optical axis angle 167 in the range of about 29 to 31 degrees and thickness 180 of about 5.6 microns. In other embodiments, an ANSI contrast of about 500:1 can be obtained using an optical axis angle 167 angle of 26±1 degrees and thickness 180 in the range of about 3.5 to 4 microns.

The LCP 115 can be composed of any conventional material that permits the manipulation of polarized light in the manner described herein. For example, in some preferred embodiments the LCP 115 is a liquid crystal on silicon panel. In some embodiments, such as when a compact system 102 is desired, the LCP 115 has height and width dimensions on the order of 1 to several millimeters. For example, in some preferred embodiments of such a compact system 102 the LCP 115 has a height 181 and width 182 that both range from about 3 to 5 millimeters.

The converging lens 135 can be composed of any material that is transparent to the source light 125 and have any shape and dimensions that facilitate directing the reflected light 140, 142 so as to substantially land on the opposing (e.g., facing) surface 145 of the PBS 120 (e.g., about 90 percent or more of the reflected light). Continuing with the example compact system 102, in some preferred embodiments, the converging lens 135 is a positive (e.g., converging) glass or plastic lens having a focal length of about 13 mm. In some preferred embodiments, to facilitate having a compact system 102, the converging lens 135 has a diameter 185 that ranges from about 1 to 1.2 times the larger of the height and width dimensions 181, 182 of the reflective planar surface 127. Consider, e.g., the case when the reflective planar surface 127 has a rectangular shape with a height 181 and width 182 of about and 5 mm, respectively. Some preferred embodiments of the converging lens 135 have a diameter 185 in the range of about 5 to 6 mm.

Because the converging lens 135 can reduce the spreading of light 140, 142 reflected from the LCP 115, the dimensions of the PBS 120 can also be reduced, thereby facilitating a compact system 102 design. Continuing with the above example compact system 102, in some preferred embodiments, the PBS 120 has height, thickness and width dimensions 190, 192, 194 that range from about 1 to 1.2 times the larger of the height and width dimensions 181, 182 of the reflective planar surface 127. In the case when larger of the height and width dimensions 181, 182 equals about 5 mm, the PBS's height, width and depth dimensions 190, 192, 194 dimension are in the range of about 5 to 6 mm. Similarly, height and width dimension 196, 198 of the o-plate 130 can range from about 1 to 1.2 times the larger of the height and width dimensions 181, 182.

FIG. 1A presents an example configuration of the device 100 and system 102 where the source light 125 is vertically polarized light and the PBS 120 is configured to reflect the vertically polarized light 125 to the LCP 115. In such configurations, horizontally polarized light 140 is reflected from the LCP 115 (e.g., activated pixels 150) and transmitted straight through the PBS 120 to the projection optics 120 of the system 102. The vertically polarized light 142 reflected from the LCP 115 (e.g., non-activated pixels 150), including light compensated by the o-plate 130, is reflected through the PBS 120 to the origin of the source light 125 (e.g., the light source 105).

Figure 2:
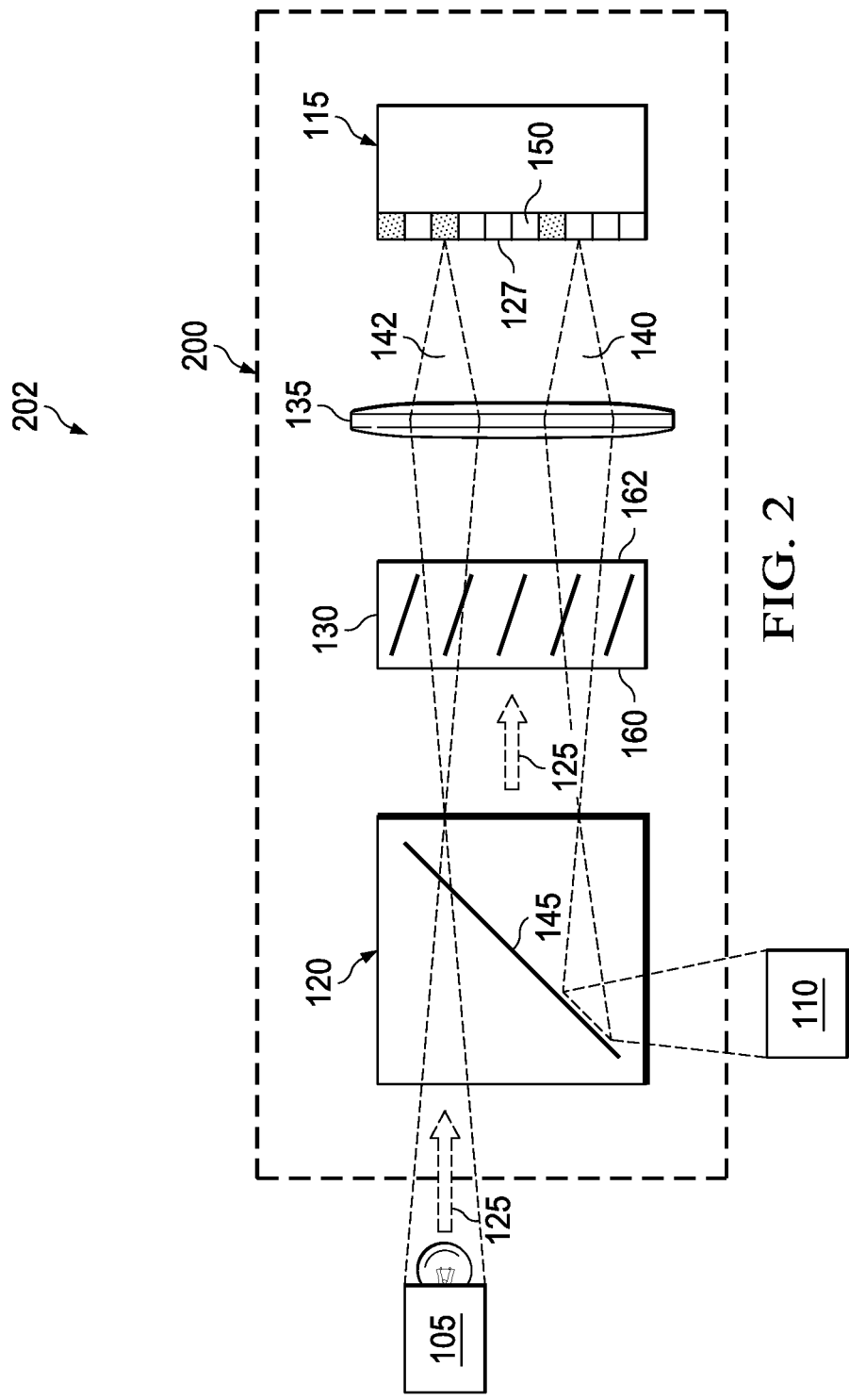
FIG. 2 presents a plane view of an alternative example configuration of a spatial light modulator, shown as part of an optical image projection system of the disclosure.

FIG. 2 presents a plan view of an alternative example configuration of a light modulator device 200 (e.g., spatial light modulator), also shown as part of an optical image projection system 202 of the disclosure. The same reference numbers as used in FIG. 1A are used to depict analogous components and features of the device 200 and system 202. In this example configuration of the device 200 and system 202, the source light 125 can be horizontally polarized light and the PBS 120 can be configured to transmit the horizontally polarized light 125 straight through the PBS 120 to the LCP 115. In such configurations, vertically polarized light 140 reflected from the LCP 115 (e.g., activated pixels 150) is reflected by the PBS 120 to the projection optics 120 of the system 102. Horizontally polarized light 142 reflected from the LCP 115 (e.g., non-activated pixels 150), including light compensated by the o-plate 130, passes through the PBS 120 to origin of the source light 125.

Another embodiment is an optical image projection system 300. In some preferred embodiments, the system 300 is con-figured as a hand-held projection system. Non-limiting examples include cell phones, personal digital assistants, or media players.

Figure 3:
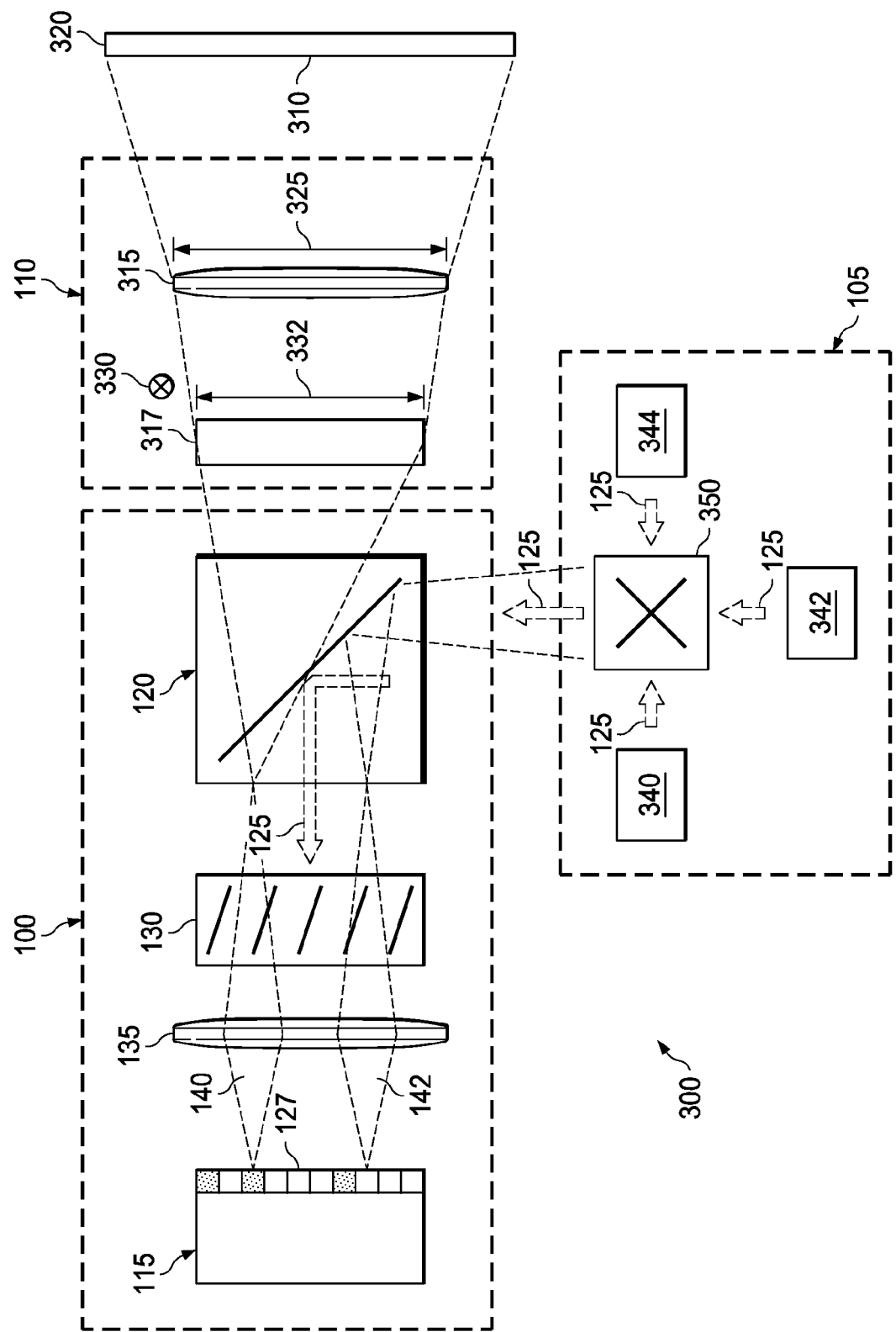
FIG. 3 presents a plan view of an example optical image projection system 300 that includes a spatial light modulator such as presented in FIG. 1A or 2.

FIG. 3 presents a plan view of an example optical image projection system 300 that includes a light modulator device (e.g., spatial light modulator). For the purposes of illustration the device 100 configuration presented in FIG. 1A is shown. However, other configurations such as the device 200 configuration presented in FIG. 2 could also be used. For clarity the same reference number as used in FIG. 1A are used to depict analogous features of the system 300.

The system 300 comprises a light source 105, the light modulator device 100 (e.g., spatial light modulator), and projection optics 110. The light source is configured to emit a source light 125, and the light modulator device 100 is optically coupled to the light source. For instance the device 100 can be configured to receive the source light 125. For instance, the PBS 120 of the device 100 can be orientated to direct the source light 125 towards a reflective planar surface 127 of the LCP 115. The LCP 115, PBS 120, o-plate 130 and converging lens 135 of the device 100 can have any of the configurations as described in the context of FIG. 1 or 2.

The projection optics are configured to receive light output from the PBS 120. The projection optics 110 can include mirrors, lens, polarizers or other optical components configured to further improve image contrast, and, to direct and direct images formed on the LCP 115 and facilitate passing the light 140 through the PBS 120 to a target projection surface 310 (e.g., a viewing surface). For clarity, only two components, one projection lens 315 and one polarizer 317, of the projection optics 110 are depicted.

In some cases the target projection surface 310 is the surface of a projection screen 320 that is also part of the system 300. In such embodiments the projection screen 320 is optically coupled to the projection optics 110. For example, the projection screen 320 could be a front or rear projection screen that is aligned with the projection optics 110. In other cases, however, the target projection surface 310 can be the surface of a structure that is external to the system 300. For example, the projection screen 320 could be a wall (e.g., a white wall), table-top surface or other planar structure having a blank surface thereon that could serve as the target projection surface 310. In some cases the surface 310 can be e.g., a diffusely reflecting planar surface.

Because the converging lens 135 decreases the spreading of light 140, 142 reflected from the LCP 115, more compact components 315, 317 of the projection optics 110 can be used that otherwise possible, thereby facilitating a compact system 300 design. For example, in some cases, the components 315, 317 of the projection optics 110 have dimensions that range from about 1 to 1.2 times the larger of the height and width dimensions 181, 182 of the reflective planar surface (FIG. 1A). For instance, consider again the case where the reflective planar surface 127 of the LCP 115 have height and width dimensions 181, 182 that both range from about 3 to 5 millimeters (FIG. 1A). In such instances, the projection lens 315 can have a diameter 325 in the range of about 5 to 6 mm and the polarizer 317 can have a height 330 and width 332 of about 5 to 6 mm.

In some embodiments, the light source 105 comprises one or more lasers 340, 342, 344 configured to emit the source light 125 as one of vertically polarized light or horizontally polarized light. In some embodiments the lasers 340, 342, 344 are configured to emit the source light 125 as linearly polarized light. For the embodiment depicted in FIG. 3, three lasers 340, 342, 344 are each configured to generate pulsed light of a designated color, e.g., red, green, and blue, respectively. The light output from the lasers 340, 342, 344 can be synchronized so that the PBS 120 receives a periodic train of different colors of light 125. The light source 105 can further comprise a color combiner 350 configured to receive the source light 125 from the lasers 340, 342, 344 and direct the light 125 towards the PBS 120. One skilled in the art would be familiar with the use of other optical components to further adjust the source light 125 that is directed to the PBS 120, if necessary. For example, the light source 105 can further comprise lens, polarizers, mirrors, diffusers or other optical components (not shown).

Still another embodiment of the disclosure is a method of projecting an image. Any of the embodiments the devices 100, 200, or systems 102, 202, 300 discussed in the context of FIGS. 1-3 can be used to implement steps in the method. With continuing reference to FIGS. 1-3, FIG. 4 presents a flow diagram of optical image projection.

The method includes a step 405 of directing a source light beam 125 (e.g., having a first polarization state) through a PBS 120 towards a reflective planar surface 127 of a LCP 115. The PBS 120 has a planar surface 125 opposing (e.g., facing) the reflective planar surface 127. In some preferred embodiments, the planar surface 125 is substantially parallel to the reflective planar surface 127. On route to the LCP 115, the light 125 also passes through the o-plate 130 and converging lens 135.

The method 400 also includes a step 410 of forming an image on the reflective planar surface 127. Forming the image (step 410) includes reflecting (e.g., simultaneously reflecting) the source light 125 off of activated pixels 150 (e.g., a first set of pixels) in step 412 and the non-activated pixels 150 (e.g., a second set of pixels) in step 415. The first and second sets of liquid crystal pixels cause reflected light 140, 142 to be in different polarization states. For instance, the source light 125 reflected off of selected activated pixels 150 has a second polarization state that is substantially orthogonal (e.g., opposite) to the first polarization state of the source light 125. The source light 125 reflected off of selected non-activated pixels has a substantially same polarization state as the first polarization state. However, as discussed above, due to PLRS, a portion of reflected light beams 142 from the non-activated pixels have a second polarization state that is opposite to the first polarization state of the source light 125.

One skilled in the art would understand that the first and second polarization states are not fixed to the same values for all of the light beams 125. Rather, each light beam 125 that is not along the optical axis (e.g., a non-normal incident angle 155) would have its own particular reflected and transmitted first and second polarization states with respect to the PBS.

The method 400 further includes a step 420 of passing the reflected light beams 140, 142 from the activated and the non-activated pixels 150 to (and through) a converging lens 135. The converging lens 135 can be configured to direct substantially all of the reflected light beams 140, 142 onto the opposing (e.g., facing) surface 125 of the PBS 120.

The method 400 still further includes a step 425 of passing the reflected light beams 140, 142 from the activated and the non-activated pixels 150 to (and through) an o-plate 130. The o-plate 130 can be configured to compensate the reflected light beams 142 from the non-activated pixels 150 to have the first polarization state that is directed by the PBS toward the source light direction (e.g., the same first polarization state as the polarization state of the source light 125). That is, the o-plate 130 acts to compensate the reflected light beams 142 from the non-activated pixels that have non-normal incident angles 155 so as to substantially return their polarization state to the first polarization state.

Figure 4:
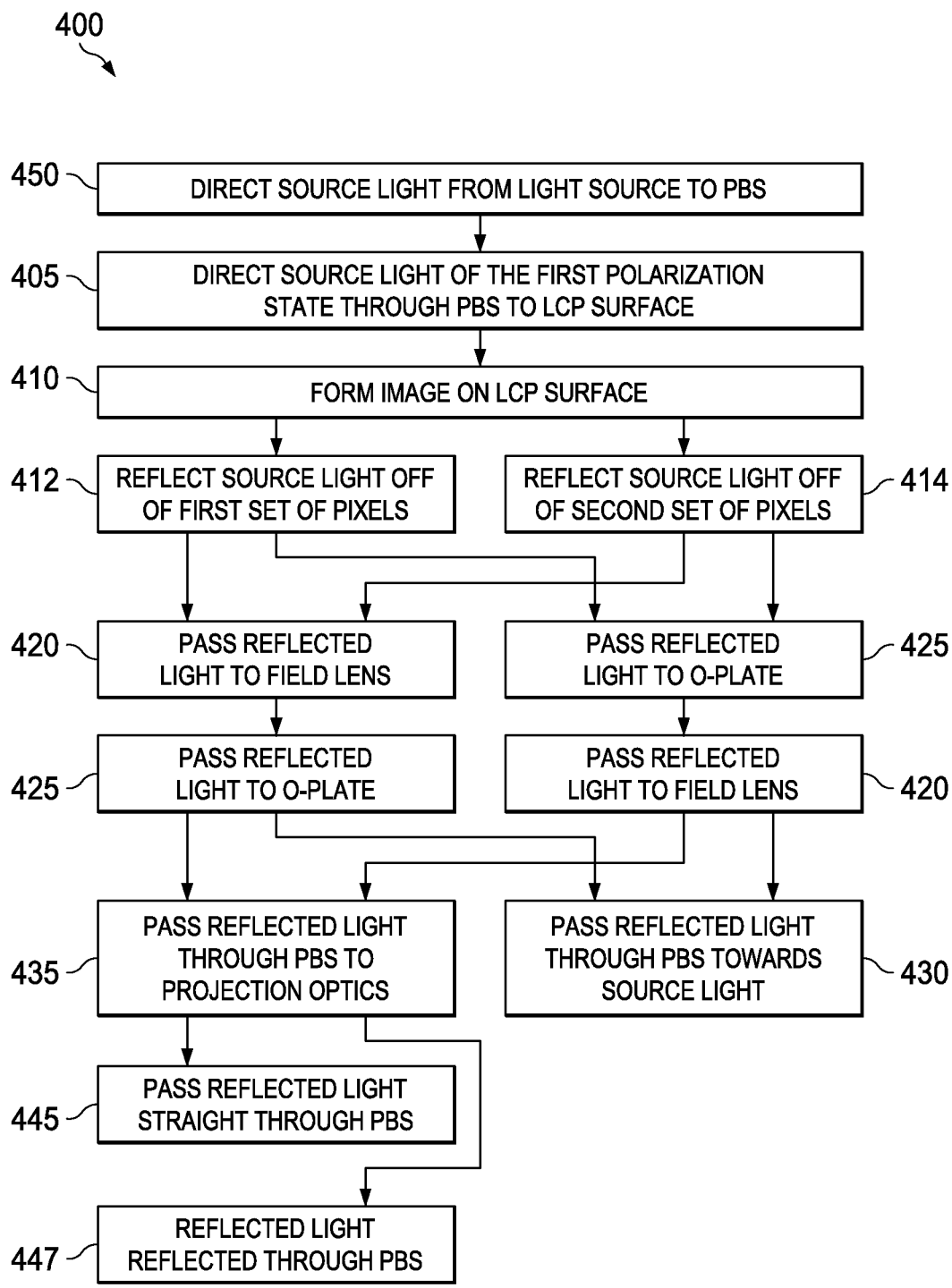
FIG. 4 presents a flow diagram of an example method of projecting an image, for example using devices and systems such as those shown in FIGS. 1A-3.

As further illustrated in FIG. 4, in some cases, the reflected light beams 140, 142 pass to the converging lens 135 (step 420) and then to the o-plate 130 (step 425). In other cases, the reflected light beams 140, 142 pass to the o-plate 130 (step 425) and then to the converging lens 135 (step 420).

The method 400 also includes a step 430 of passing the reflected light beams 140, 142 (e.g., light reflected from a second set of non-activated pixels) from the converging lens 135 and the o-plate 130 through the PBS 120 such that the reflected light 140, 142 having the first polarization state is directed to the source light 125.

Preferably, the method includes a step 435 of passing the reflected light 140, 142 from the first set of pixels (e.g., activated pixels 150) through the PBS 120 to projection optics. For instance, step 435 can include passing the reflected light beams 140 having a second polarization state through the PBS 120 towards projection optics. The light can further pass to a viewing screen (e.g., a diffusely reflecting planar screen). In some cases passing the reflected light beams 140 having a second polarization state (step 435) includes a step 445 of passing the reflected light 140 (having the second polarization state) from the activated pixels 150 straight through the PBS 120 to projection optics 110 (e.g., FIG. 1A). In other cases, passing the reflected light beams 140 having a second polarization state (step 435) includes a step 447 of reflecting the reflected light 140 from the activated pixels 150 through the PBS 120 to the projection optics 110 (e.g., FIG. 2).

In other cases, reflected light from the second set of non-activated pixels 152 can be configured to pass through the PBS to the projection optics 110, and, reflected light from the first set of activated pixels 152 can be configured to pass through the PBS 120 to the source light 125.

In some embodiments, the method 400 further includes a step 450 of directing the source light beam 125 generated from a light source 105 to the PBS 120. In some embodiments, the source light beam 125 is emitted from a light source 105 having at least one laser configured to emit one light in a first polarization state (e.g., one of vertically polarized light or horizontally polarized light).

Although some embodiments of the disclosure have been described in detail, those of ordinary skill in the art should understand that they could make various changes, substitutions and alterations herein without departing from the scope of the disclosure.

What is claimed is:

1. A method of projecting an image, comprising:
   directing a source light beam through a polarization beam splitter towards a reflective planar surface of a array-type liquid crystal panel, wherein said polarization beam splitter has a planar surface facing said reflective planar surface;
   reflecting said source light off of first and second sets of liquid crystal pixels of said array-type liquid crystal panel, said first and second sets of liquid crystal pixels causing reflected light to be in different polarization states;
   passing said reflected light through a converging lens, wherein said converging lens is located between said polarization beam splitter and said array-type liquid crystal panel, and, said converging lens directs said reflected light from said planar reflective surface to a facing surface of said polarization beam splitter; and
   passing said reflected light through an oblique wave plate.

2. The method of claim 1, further includes passing said reflected light from said first set of pixels straight through said polarization beam splitter to projection optics.

3. The method of claim 1, further includes reflecting said reflected light from said first set pixels through said polarization beam splitter to projection optics.

4. The method of claim 1, further including directing said source light beam generated from a light source to said polarization beam splitter.

5. The method of claim 1, wherein said oblique wave plate is located between said polarization beam splitter and said array-type liquid crystal panel.

6. The method of claim 1, wherein said oblique wave plate is located between said polarization beam splitter and said converging lens.

7. The method of claim 1, wherein said oblique wave plate is located between said converging lens and said array-type liquid crystal panel.

8. The method of claim 1, wherein the converging lens is closer to the array-type liquid crystal panel than any other lens of the modulator.

9. The method of claim 1, wherein passing said reflected light through said oblique wave plate compensates polarization changes due to reflection from non-activated pixels of the array type liquid crystal panel.

10. The method of claim 1, further including rotating a planar surface of said oblique wave plate with respect to a normal axis to said oblique wave plate, to define an angle between an optical axis of said oblique wave plate and said normal axis, wherein the angle is in a range from 3 to 4 degrees with respect to a horizontal plane of said modulator.

11. The method of claim 1, wherein said oblique wave plate is composed of a birefringent material having an optical axis that is neither parallel nor perpendicular relative to outer surfaces of the oblique wave plate.

* * * * *